United States Patent Office 3,849,385
Patented Nov. 19, 1974

3,849,385
CURABLE OLEFIN COPOLYMERS AND PROCESS FOR PRODUCING THE SAME
Teruo Oshima, Nishinomiya-shi, Tsuneyuki Nagase and Fujio Masuko, Takatsuki-shi, Takeshi Wada, Takasaki-shi, Masaaki Hirooka, Ibaragi-shi, and Isoji Taniguchi, Toyonaka-shi, Japan, assignors to Sumitomo Chemical Company, Ltd., Osaka, Japan
No Drawing. Filed Sept. 16, 1968, Ser. No. 762,342
Int. Cl. C08f 5/00, 15/40
U.S. Cl. 260—80.78     11 Claims

ABSTRACT OF THE DISCLOSURE

Terpolymers comprising ethylene, propylene and 5-isopropylidene-2-norbornene, particularly linear amorphous solid terpolymers containing 10–60 mol percent of propylene and having an iodine number of 0.5–100, which are high in curing rate and excellent in randomness. The terpolymers are obtained by contacting ethylene, propylene and 5-isopropylidene-2-norbornene with a catalyst system containing as essential components an organoaluminum halide and a vanadium compound having a valency of 3 or more. Particularly when the copolymerization is effected in the presence of hydrogen, the formation of a gel can be substantially prevented. Further, the gradual addition of 5-isopropylidene-2-norbornene is desirable for the production of copolymers excellent in curing characteristics.

---

This invention relates to terpolymers comprising ethylene, propylene and 5-isopropylidene-2-norbornene and a process for production thereof. Particularly, the invention pertains to amorphous solid copolymers comprising ethylene, propylene and 5-isopropylidene-2-norbornene which are excellent in curability and a process for production thereof. The invention is further concerned with a process for preparing copolymers high in curing rate which are composed of ethylene, propylene and 5-isopropylidene-2-norbornene and in which the diene component has been uniformly distributed. According to the process of the present invention, no gel formation takes place during the copolymerization.

In general, copolymers of ethylene and propylene have excellent characteristics as elastomers, but are not curable since they have no unsaturated groups. In order to overcome the above drawback, various attempts have been made. Particularly, there have been proposed many processes for copolymerizing non-conjugated diene compounds with ethylene and propylene to obtain a curable copolymer. For the production of rubbers excellent in curing characteristics, however, it is not always possible to say that any compounds may be used. As the most excellent diene components of ethylene-propylene-diene rubbers (hereinafter referred to as "EPDM") which have heretofore been produced on commercial scale, there are dicyclopentadiene, 5-methylene-2-norbornene, 1,4-hexadiene and the like (refer to U.S. Pats. 3,000,866, 3,063,973, 3,093,620, 3,093,621 and 3,151,173).

From the EPDM, curable products can be obtained, but it is well known that they are markedly low in curing rate as compared with other conventional rubbers, particularly diene type rubbers. Accordingly, the advent of EPDM higher in curing rate is desired. In view of the scientific level at present, however, it is extremely difficult to infer the extent of curing rates of the compounds from the chemical structures of the compounds. For example, a considerable difference in curing rate is seen between dicyclopentadiene and 5-methylene-2-norbornene, though these are norbornene derivatives, and considerable differences in copolymerization characteristic and curing rate are observed even between 5-methylene-2-norbornene and 5-ethylidene-2-norbornene which are alkylidene-norbornene compounds. Further, even when a same diene component is used in the preparation of EPDM, there are cases where favorable curing characteristics are attained or not attained depending on the kind of catalyst employed and on reaction conditions thereof. The curing characteristics of the resulting copolymers are dependent upon how efficiently the diene component is introduced into the copolymers and how uniformly the diene component had been distributed in the copolymers, and the physical properties of cured products obtained from such copolymers are greatly dominated by said characteristics.

On the other hand, during the course of production of such copolymers, there are some cases where the deposition of gels or insoluble polymers takes place. Such gel-like substances are liable to be formed in copolymerization reactions using diene components, and it is of great importance, particularly in a continuous process, that the copolymerization is effected under such conditions as not to form such gel-like substances.

The present inventors made extensive investigation in order to obtain diene compounds, which are more excellent in curing characteristics than the conventional diene compounds, to find that 5-isopropylidene-2-norbornene, in particular, can be an effective diene component. Based on the above finding, the inventors have attained the present process. From the conventional knowledges, it was impossible to infer what effect was displayed by 5-isopropylidene-2-norbornene when it was subjected to copolymerization with ethylene and propylene to form a terpolymer. The present inventors have, however, found that 5-isopropylidene-2-norbornene is more excellent than 5-methylene-2-norbornene, which is a norbornene compound having the same alkylidene group, in that it not only greatly accelerates the curing rate of the resulting copolymer but also is high in copolymerizability, and in that it brings about such advantage that a gel is difficultly by-produced during the copolymerization. Further, the above-mentioned compound employed in the present invention is high in copolymerizability with ethylene and propylene to make it possible to easily attain such conditions that the recovery of unreacted compound is not substantially necessary.

The inventors have further found that when, in the production of EPDM comprising ethylene, propylene and 5-isopropylidene-2-norbornene, a catalyst containing an alkylaluminum halide and a vanadium compound having a valency of 3 or more is used, it is possible to obtain in high yields EPDM excellent in randomness of monomer unit distribution and particularly prominent in curing characteristics.

The inventors have still further found that when the copolymerization of ethylene, propylene and 5-isopropylidene-2-norbornene is effected in the presence of hydrogen by use of the said catalyst system, no substantial gel formation takes place during the copolymerization reaction, and the 5-isopropylidene-2-norbornene in the resulting copolymer becomes uniform and random in distribution, with the result that a copolymer having excellent curing characteristics can be obtained.

Heretofore, it has been known that in the polymerization reactions using Ziegler-Natta type catalysts, hydrogen acts as a molecular weight regulator. It has also been known that certain other compounds, such as dialkylzincs, allyl halides and pyridine-N-oxide, have molecular weight-regulating actions, as well. However, the inventors have found the fact that among the above-mentioned molecular weight regulators, only hydrogen is effective for the substantial prevention of gel formation.

The inventors have still further found that when, in the production of a terpolymer comprising ethylene, propylene and 5-isopropylidene-2-norbornene, the 5-isopropylidene-2-norbornene is added continuously or intermittently to the copolymerization system, the 5-isopropylidene-2-norbornene component is unformly dispersed in the terpolymer to give a terpolymer having the most excellent curing characteristics.

A primary obect of the present invention is to provide EPDM excellent in curing characteristics in which a diene component has been uniformly dispersed.

A secondary object of the invention is to provide a process for producing, without formation of a gel, EPDM excellent in curing characteristics in which a diene component has been uniformly dispersed.

Other objects will become clear from the description that follows.

In order to achieve the above objects, the present invention provides amorphous linear solid copolymers comprising ethylene, propylene and 5-isopropylidene-2-norbornene.

The invention further provides a process for producing linear, amorphous, solid terpolymers composed of ethylene, propylene and 5-isopropylidene-2-norbornene which comprises contacting ethylene, propylene and 5-isopropylidene-2-norbornene, preferably in the presence of hydrogen, with a catalyst obtained by contacting (1) an organoaluminum halide having the formula:

$$AlR_nX_{3-n}$$

wherein R is a hydrocarbon residue; X is a halogen atom; and $n$ is an arbitrary number of 1 to 2, with (2) a vanadium compound having a valency of 3 to 5, said organoaluminum halide and vanadium compound being essential constituents of the catalyst.

The 5 - isopropylidene - 2 - norbornene employed in the present invention is a compound having the structural formula:

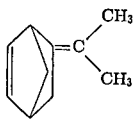

In respect of the organoaluminum compound used in the present process, preferable example of a hydrocarbon residue of said R is an alkyl, aryl, aralkyl, alkylaryl or cycloalkyl group having 1–20 carbon atoms. Particularly, the use of an alkyl group having 1–6 carbon atoms gives favorable results. If necessary, a compound having other hydrocarbon group, such as an alkenyl or cyclopentadienyl group, may also be used. As said X, chlorine, bromine or iodine is used. In some cases, fluorine may also be used. The above organoaluminum halide is not always required to be a compound comprising a single component, but may be an optional mixture so far as the average composition thereof coincides with the said formula.

In case a trialkylaluminum, for example, is used as a catalyst component in place of the present organoaluminum halide, in general, the polymerization activity is lower than those in the present invention, or there is obtained a polymer inferior in physical properties even though the polymerization activity is same as in the case of the present invention. For example, a polymer which contains a crystalline portion and is low in randomness is obtained, or the manner of reaction of the diene component is not suitable and therefore no terpolymer having sufficiently satisfactory curing characteristics can be attained. In contrast thereto, the copolymer obtained according to the present process is characterized in that it is high in randomness and is excellent in uniformity as compared with the copolymer obtained by the conventional process. Accordingly, the present copolymer, when cured, is excellent in physical properties and gives a rubber high in tensile strength.

These organoaluminum halides include, for example, such compounds as ethylaluminum dichloride, ethylaluminum dibromide, ethylaluminum diiodide, n-propylaluminum dichloride, isobutylaluminum dichloride, n-hexylaluminum dichloride, octadecylaluminum dichloride, phenylaluminum dichloride, ethylaluminum sesquichloride, ethylaluminum sesquibromide, ethylaluminum sesquiiodide, methylaluminum sesquichloride, n-propylaluminum, sesquichloride, isobutylaluminum sesquichloride, n-hexylaluminum sesquichloride, cyclohexylaluminum sesquichloride, 2-ethylhexylaluminum sesquichloride, laurylaluminum sesquichloride, diethylaluminum chloride, dimethylaluminum chloride, di-n-butylaluminum chloride, ethylpropenylaluminum chloride, dicyclopentadienylaluminum chloride and cyclohexylethylaluminum chloride; mixtures thereof in optional proportions; and mixtures thereof with trialkylaluminums and alumininum halides. Alternatively, there may be exemplified mixtures formed by blending trialkylaluminums with aluminum halides so as to be conformed to the aforesaid formula $AlR_nX_{3-n}$.

Particularly when the organoaluminum halide is a mixture of, for example, a dialkylaluminum halide and a monolkylaluminum dihalide or an alkylaluminum sesquihalide, excellent yields can be obtained. Further, thus obtained copolymers are particularly excellent also in curing characteristics. It has been found that among the organoaluminum halides employed in the present invention, those having an ethyl group give particularly prominent results.

Preferable as the vanadium compound, which is another component of the catalyst, are trivalent to pentavalent vanadium compounds hving at least one group selected from halogen, acylacetonyl, alkoxy and cyclopentadienyl compounds. These compounds include vanadium halides, vanadyl halides, vanadium acetylacetonates, vanadyl acetylacetonates, vandium haloacetylacetonates, vanadyl haloacetylacetonates, orthovanadic acid esters, e.g. orthovanadate having $C_1$–$C_{20}$ hydrocarbon groups, particularly orthovanadate having $C_1$–$C_8$ alkyl groups, vanadyl haloalkoxides, cyclopentadienyl vanadiums and halogencyclopentadienyl vanadiums. These may be, for example, vanadium tetrachloride, vanadium trichloride, vanadyl trichloride, vanadyl tribromide, vanadium triacetylacetonate, vanadyl acetylacetonate, dichlorovanadyl acetylacetonate, chlorovanadyl diacetylacetonate, triethyl orthovanadate, triisobutyl orthovanadate, tri-n-hexyl orthovanadate, tricyclohexyl orthovanadate, triphenyl orthovanadate, chlorovanadyl diethoxide, bromovanadyl diethoxide, chlorovanadyl-di-n-octoxide, dichlorovanadyl methoxide, dichlorovanadyl ethoxide, dichlorovanadyl steroxide, dicyclopentadienyl vanadium and dichloro-dicyclopentadienyl vanadium. Among these, vanadyl trichloride, vanadium tetrachloride and orthovanadic acid esters are particularly advantageous from the economical standpoint and are apt to give favorable results. It is also possible to add a compound of a metal such as titanium to these vanadium compounds. If necessary, other vanadium compound capable of forming a coordination catalyst with the above-mentioned organoaluminum compound may be used. Such vanadium compound is, for example, an organic acid salt of vanadium, vanadium phosphate, vanadium salicylate or the like.

In the proces of the present invention, other suitable compound may be added as a third component of the catalyst. As such compounds, there are, for example, polar compounds having actions to coordinate or having charge transfer interaction with the organoaluminum compounds or the vanadium compounds, or various oxidizing substances capable of preventing the vanadium compounds from lowering in activity due to excessive reduction with the organoaluminum compounds. The polar compounds include, for example, amines cyclic nitrogen compounds, acid amides, ethers, esters, ketones, aldehydes, and compounds of elements of Group 5b of the Periodic Table such as phosphorus, arsenic, antimony and bismuth. The oxidizing substances include, for example, halogens, sulfur, metal halides, oxygen, nitro compounds, nitroso compounds, organic nitrates, organic nitrites, N-oxides, P-oxides, azo compounds, organic sulfides, organic disulfides, quinones and acid halides. Generally speaking, these third components in the catalyst compositions are preferably used in an amount less than that of the organoaluminum halide component.

As specific catalyst combinations usable systems prepared by contacting an organoaluminum dihalide with a sulfonic acid halide, e.g. benzenesulfonyl chloride or toluenesulfonyl chloride, and adding a vanadium compound to the mixture. These catalyst systems are excellent in polymer yields based on vanadium.

Further, only when the catalyst systems in the present invention are used, the polymerization is promoted by addition of a suitable a amount of hydrogen to give a copolymer in high yield. Moreover, when the above-mentioned catalyst system is employed, a copolymer having a desirable molecular weight can be easily obtained even if hydrogen is used in a relatively small amount. This means that the copolymerization using hydrogen, which is low in solubility for the reaction medium, can be effected under a relatively low pressure. In this respect, the present process is markedly advantageous from the industrial standpoint.

In practicing the process of the present invention, proportions of organoaluminum halide and vanadium compound are not particularly limited. However, favorable results are obtained when the molar ratio of organoaluminum halide to vanadium compound is from 1:1 to 10,000:1, preferably from 2:1 to 300:1. The concentration of the vanadium compound in a reaction medium is from 0.001 to 50 mmol./l., preferably from 0.01 to 5 mmol./l. In some cases, however, the polymerization can be effected even when the vanadium compound is used at a concentration of, for example, $10^{-4}$ mmol./l. Further, the concentration of the organoaluminum halide in a reaction medium is from 0.05 to 100 mmol./l., preferably from 0.5 to 10 mmol./l.

In practicing the present process, the catalyst components may be added to the reaction system according to optional procedures. For example, a mixture of the catalyst components is previously formed and then charged into a reaction medium containing the monomers, or the catalyst components are separately added to the reaction system. In case a high catalyst activity is desired to be obtained, it is desirable, in general, to mix the organoaluminum halide with the vanadium compound in the presence of monomers. Further, it is effective to mix the catalyst components in the presence of hydrogen or in the presence of monomers and hydrogen.

In effecting the present process, hydrogen may be added according to an arbitrary procedure. It may be added in admixture with ethylene and propylene monomers, or may be introduced in the form of a solution in a solvent. The amount of hydrogen to be added varies depending on the polymerization conditions, particularly the reaction temperature, the amounts of reactants to be polymerized and the monomer compositions, and can be adequately decided so as to be suitable for the molecular weight of the desired polymer. Generally, it is preferably, in most cases, that hydrogen is dissolved in an amount of about 0.01 to 50 mol. percent based on the total amount of ethylene and propylene dissolved in the polymerization medium. Particularly, when the polymerization is effected at about room temperature, the presence of about 0.05 to 1 mol. percent of hydrogen results ordinarily a terpolymer which is excellent in processability and has a preferable molecular weight. In case the polymerization is to be controlled by the concentration of hydrogen in the gas phase which is in equilibrium with the polymer solution, a hydrogen concentration of about 1 to 60 mol. percent is frequently employed, in general. These values, however, are mere standards and, if necessary, other hydrogen concentration may also be used depending on polymerization conditions.

The proportions of ethylene and propyelne are variable depending on the desired properties of the resulting copolymer. If the proportion of ethylene is greater, a crystalline copolymer tends to be formed, in general. Accordingly, in order to produce an amorphous elastomer, which is the main object of the present invention, it is necessary to avoid the use of ethylene in an excessively large amount. For this, the proportion of feed ethylene should be 85 mol. percent or less. A proportion of propylene, to the ethylene and propylene mixture in the reaction system, of 50 to 98 mol. percent, preferably 70 to 95 mol. percent, is frequently employed. If necessary, a reaction system having other composition than above may, of course, be adopted. Among the monomer components, 5-isopropylidene - 2-norbornene, in particular, may have previously been dissolved in a reaction medium, or may be added simultaneously with other monomers or may be added continuously or intermittently.

5-isopropylidene-2-norbornene differs in relative reactivity with ethylene and propylene. In order to obtain a copolymer having most excellent curing characteristics, it is desirable that 5-isopropylidene-2-norbornene is added either continuously or intermittently during the course of the copolymerization reaction. Particularly, it is desirable that 5-isopropylidene-2-norbornene is added in such a proportion that the iodine number of the resulting copolymer becomes substantially definite through the course of polymerization. Generally speaking, it is desirable that the said diene component be added so that the iodine number of the terpolymer becomes 0.5 to 100, preferably 5 to 40. The concentration thereof in a polymerization medium varies depending on the rate of formation of the terpolymer and other conditions, but such a concentration as 0.1 to 100 mmol./l. is frequently employed.

The reaction can be effected under from reduced pressure to a pressure of 100 kg./cm.$^2$. It is possible to carry out the reaction in a state diluted with other inert gas.

As the reaction temperature, there may be adopted an optional temperature ranging from such a low temperature as $-78°$ C. to such a high temperature as $+100°$ C. Generally, however, a temperature between $-35°$ C. and $+70°$ C. gives favorable results.

In the present process, the temperature condition is of importance. This is connected with the fact that the lower the temperature, the greater the durability of catalyst activity and the longer the catalyst life, and high polymer yields can be attained at low temperatures rather than at high temperatures.

In the practice of the present invention, an inert solvent can be used, in general. Alternatively, a liquefied monomer may be employed as this kind of medium. Preferable as the inert solvent of this kind are common hydrocarbon compounds or halogenated hydrocarbon compounds such as, for example, propane, butane, pentane, hexane, heptane, octane, petroleum ether, other petroleum type mixed solvent, benzene, toluene, xylene, cyclohexane, methylcyclohexane, methylene dichloride, ethylene dichloride, trichloroethane, tetrachloroethylene, butyl chloride, chlorobenzene and bromobenzene.

After completion of the polymerization reaction, an after-treatment is effected according to an ordinary procedure to purify and recover the polymerization product. As such procedure, there may be adopted an arbitrary after-treatment procedure employed in a polymerization reaction by use of a Ziegler-Natta catalyst, such as water treatment, steam treatment, alcohol treatment, alcohol-hydrochloric acid treatment, hydrochloric acid treatment, alkali treatment, aqueous emulsifier solution treatment, chelating agent treatment, or the like treatment. Alternatively, a solid substance may be recovered by salting-out said substance or by removing the solvent, without adopting the above-mentioned treatment. It is also possible to add, either during or after said treatment, an antioxidant and other additives.

Terpolymers provided by the present invention are linear, amorphous, solid teropolymers composed of ethylene, propylene and 5-isopropylidene-2-norbornene, and have many advantages in processability, curing characteristics and the like as compared with conventional terpolymers comprising ethylene, propylene and a diene component.

The copolymers of the present invention are suitable as elastomers when they contain 10-60 mol. percent of propylene.

The EPDM of the present invention and conventional EPDM using known third components were compared in curing rate at 160° C. by means of a rheometer according to the following curing prescription.

| Curing prescription: | Parts by weight |
|---|---|
| Rubber | 100 |
| Stearic acid | 1 |
| ZnO | 5 |
| HAF carbon black | 50 |
| Sulfur | 1.5 |
| Tetramethylthiuram monosulfide | 1.5 |
| Mercaptobenzothiazole | 0.5 |
| β-Phenylnaphthylamine | 1.0 |

The results of comparison in curing rate were as shown in the table below in which the curing rate was calculated from the tangent of the curve for the torque of rheometer and curing time.

TABLE.—COMPARISON IN CURING RATE OF VARIOUS EPDM

| Third component (mol./100 g. of polymer) | Propylene content (mol. percent) | Curing rate (kg. cm./min.) |
|---|---|---|
| Dicyclopentadiene (0.04) | 28 | 6 |
| 1,4-hexadiene (0.04) | 37 | 12 |
| 5-methylene-2-norbornene (0.03) | 42 | 13 |
| 5-isopropylidene-2-norbornene (0.04) | 36 | 20 |

The comparison in curing rate shown in the above table indicates that the present EPDM using 5-isopropylidene-2-norbornene as the third component is more excellent in curing characteristics than the conventional EPDM.

Further, according to the process of the present invention, the formation of gel-like substances during the production of copolymer can be substantially inhibited as compared with the case of the conventional processes, with the result that the copolymerization can be effected in a continuous manner.

Furthermore, in accordance with the present process, the diene component employed is less in retarding action to the copolymerization, and a high polymer yield can be attained particularly when the diene component is added either continuously or intermittently. In addition, the present process not only gives high polymer yields but also gives copolymers excellent in random distribution of monomer units. These are the advantages of the present invention.

The present invention is illustrated in further detail below with reference to examples, but the invention is by no means limited to these examples.

EXAMPLE 1

1 liter of n-heptane was charged into a 2 liter separable flask. Into the n-heptane, a mixed gas comprising 30 mol. percent of ethylene and 70 mol. percent of propylene was introduced at 30° C. and at a rate of 10 Nl./min., and the gas was bubbled for 40 minutes to saturate n-heptane with the monomers. To the n-heptane thus saturated with the monomers, 5 mmol. of 5-isopropylidene-2-norbornene, 4 mmol. of ethylaluminum sesquichloride and 0.25 mmol. of vanadyl trichloride were added in this order. The mixture was allowed to react with stirring for 30 minutes while injecting the monomers in succession. Subsequently, 50 ml. of methanol containing β-phenyl-naphthylamine was added to terminate the reaction. The content of the flask was washed with 100 ml. of ethanol and was then charged into a large amount of methanol. Thereafter, the resulting precipitate was vacuum-dried at 40° C. to obtain 14.35 g. of a white solid copolymer. This copolymer was dissolved in xylene at 70° C. and was subjected to viscosity measurement to find that it had an intrinsic viscosity of 2.87 dl./g. As the result of infra-red analysis it was found that the copolymer had a propylene content of 41.5 mol. percent and an iodine number of 9.1. Subsequently, the copolymer was subjected to press curing at 160° C. for 40 minutes according to the aforesaid curing prescription to find that it had a tensile strength at break of 258 kg./cm.$^2$, an elongation of 350%, and a 300% modulus ($M_{300}$) of 245 kg./cm.$^2$.

EXAMPLE 2

1 liter of n-heptane was charged into the same flask as in Example 1 and was saturated at 25° C. with a mixed gas comprising 30 mol percent of ethylene and 70 mol. percent of propylene. To the n-heptane thus saturated with the monomers, 6 mmol. of 5-isopropylidene-2-norbornene, 5 mmol. of diethylaluminum chloride and 1 mmol. of vanadium triacetylacetonate were added. Subsequently, the mixture was allowed to react for 15 minutes, while injecting the monomers in succession, to obtain 11.31 g. of a copolymer. This copolymer had a propylene content of 42.9 mol. percent and an iodine number of 7.0.

A similar copolymer as above was obtained when 1 mmol. of triethyl orthovanadate was used in place of the vanadium acetylacetonate.

EXAMPLE 3

In the same manner as in Example 1, 1 liter of orthodichlorobenzene as a solvent was saturated at 25° C. with a mixture comprising 35 mol. percent of ethylene and 65 mol. percent of propylene. To the thus saturated orthodichlorobenzene, 10 mmol. of ethylaluminum dichloride, 10 mmol. of benzenesulfonyl chloride, 0.02 mmol. of vanadyl trichloride and 1 mmol. of 5-isopropylidene-2-norbornene were added. The mixture was allowed to react for 10 minutes to obtain 7.33 g. of a snow white copolymer.

EXAMPLE 4

In a thermostat at 30° C., 1 lter of n-heptane was charged into a 2 liter separable flask. Into the n-heptane, a mixed gas comprising 40 mol. percent of ethylene and 60 mol. percent of propylene was introduced at a rate of 10 l./min. and, at the same time, hydrogen was introduced at a rate of 2 l./min. After 40 minutes, 12 mmol. of 5-isopropylidene-2-norbornene, 4 mmol. of ethylaluminum sesquichloride and 4.0 mmol. of vanadyl trichloride were added in this order, and the mixture was reacted with stirring for 30 minutes. To the reaction mixture, 50 ml. of methanol containing 2,6-di-t-butyl-p-cresol in a proportion of about 2 g./l. was added to terminate the polymerization, and then the content was taken out of the flask. The reaction liquid was freed from a separated methanol layer and was charged with 100 ml. of the same methanol solution as above, and the mixture was thoroughly stirred to remove the catalyst. It was recognized that the resulting polymer solution was completely homogeneous and contained no insolubles at all. The thus obtained heptane solution of polymer was charged into a large amount of methanol, whereby a white solid copolymer deposited. The deposit was vacuum-dried at 40° C. to obtain 15.9 g. of a copolymer. The copolymer had an intrinsic viscosity of 1.61 as measured in xylene solution at 70° C., a propylene content of 34.0 mol. percent, and an iodine number of 22.4.

For comparison, a polymerization reaction was effected under the same conditions as above, except that no hydrogen was added, whereby 0.7 g. of a heptane-insoluble polymer and 12.3 g. of a heptane-soluble copolymer were obtained.

100 parts of the aforesaid copolymer was mixed with 1 part of stearic acid, 5 parts of zinc white, 1.5 parts of tetramethylthiuram disulfide, 0.5 part of mercaptobenzothiazole, 1.5 parts of sulfur and 50 parts of HAF carbon black. Subsequently, the mixture was subjected to rheometer at 160° C. From the relationship between the curing time and the torque, a value of curing rate $v=6.0$ kg.-cm./min. was obtained. The copolymer obtained from the system incorporated with hydrogen was markedly excellent in processability and was prominent in roll processability, whereas the polymer obtained from the system incorporated with no hydrogen was greatly difficult in blending operation.

EXAMPLE 5

A copolymerization reaction was effected under the same conditions as in Example 4, except that 5-isopropylidene-2-norbornene was divisionally added every 5 minutes, and the catalyst components were divisionally added every 10 minutes, so that totals of 12 mmol. of 5-isopropylidene-2-norbornene, 4 mmol. of ethylaluminum sesquichloride and 0.4 mmol. of vanadyl trichloride were added in 40 minutes, to obtain 26.3 g. of a copolymer having an intrinsic viscosity of 1.53 and an iodine number of 17.0. The curing rate $v$ of the thus obtained copolymer, as calculated in the same manner as in Example 4 by use of a rheometer, increased to 20.8 kg.-cm./min., and thus the effect of divisional addition of 5-isopropylidene-2-norbornene was observed.

What is claimed is:

1. A process for producing linear, amorphous, solid terpolymers composed of ethylene, propylene and 5-isopropylidene-2-norbornene, which comprises contacting ethylene, propylene and 5 - isopropylidene-2-norbornene in the presence of hydrogen with a catalyst obtained by contacting (1) an organoaluminum halide having the formula: $AlR_nX_{3-n}$, wherein R is a hydrocarbon residue; X is a halogen atom; and $n$ is an arbitrary number of 1 to 2, with (2) a vanadium compound having a valency of 3 to 5, said organoaluminum halide and vanadium compound being essential constituents of the catalyst.

2. A process according to claim 1, wherein the 5-isopropylidene-2-norbornene is added to the polymerization system either continuously or intermittently in the presence of hydrogen.

3. A process according according to claim 1, wherein the 5-isopropylidene-2-norbornene is added to the polymerization system so that the iodine number of the resulting copolymer becomes 0.5 to 100 during the copolymerization reaction.

4. A process according to claim 1, wherein the organoaluminum halide is ethylaluminum sesquichloride, ethylaluminum dichloride or diethylaluminum chloride.

5. A process according to claim 1, wherein the vanadium compound contains at least one group selected from halogen, acylacetonyl, alkoxy and cyclopentadienyl.

6. A process according to claim 1, wherein the catalyst system employed is prepared by contacting an organoaluminum dihalide with a sulfonic acid halide, and adding a vanadium compound thereto.

7. A process according to claim 1, wherein the catalyst components are mixed in the presence of the monomers and hydrogen.

8. A process according to claim 1, wherein the copolymerization reaction is effected under a pressure of 100 kg./cm.$^2$ or below at a temperature of $-35°$ to $+70°$ C.

9. A process according to claim 1, wherein the copolymerization reaction is effected using as a reaction medium a liquefied monomer, a hydrocarbon or a halogenated hydrocarbon compound.

10. A process according to claim 9 wherein the hydrogen is employed in an amount of from 0.01 to 50 mole percent based on the total amount of ethylene and propylene dissolved in the reaction medium.

11. A process according to claim 9 wherein the concentration of hydrogen in the reaction medium is controlled by the concentration of hydrogen in the gas phase which is from about 1 to about 60 mole percent based on the amount of ethylene and propylene dissolved in the reaction medium.

References Cited

UNITED STATES PATENTS

| | | | |
|---|---|---|---|
| 3,753,960 | 8/1973 | Easterbrook | 260—80.78 |
| 3,574,176 | 4/1971 | Boozer | 260—80.78 |
| 3,492,371 | 1/1970 | Barret | 260—889 |
| 3,478,002 | 11/1969 | Nakaguchi | 260—79.5 |
| 3,472,824 | 10/1969 | Nakaguchi | 260—80.78 |
| 3,294,766 | 12/1966 | Henderson | 200—80.5 |
| 3,234,383 | 2/1966 | Barney | 260—80.5 |

FOREIGN PATENTS

| | | |
|---|---|---|
| 1,062,543 | 3/1967 | Great Britain. |
| 1,018,778 | 2/1966 | Great Britain. |
| 1,007,908 | 10/1965 | Great Britain. |

OTHER REFERENCES

Gaylord, Norman G. and Mark, Herman F.: *Linear and Stereoregular Addition Polymers,* Interscience Publ. Inc., New York, pp. 120–121, 1959.

JOSEPH L. SCHOFER, Primary Examiner

A. L. CLINGMAN, Assistant Examiner

U.S. Cl. X.R.

252—431 R, 439; 260—37